(12) United States Patent
Peng et al.

(10) Patent No.: US 7,158,276 B1
(45) Date of Patent: Jan. 2, 2007

(54) PRESSURE SENSITIVE ELECTROCHROMIC DEVICE AND METHOD OF FABRICATING THE SAME

(75) Inventors: Chen Peng, Taipei (TW); Pei-Yih Liu, Changhua County (TW); Fung-Hsu Wu, Taoyuan (TW)

(73) Assignee: Daxon Technology Inc., Taoyuan County (TW)

( * ) Notice: Subject to any disclaimer, the term of this patent is extended or adjusted under 35 U.S.C. 154(b) by 0 days.

(21) Appl. No.: 11/423,838

(22) Filed: Jun. 13, 2006

(30) Foreign Application Priority Data

Mar. 24, 2006 (TW) ............................. 95110430 A

(51) Int. Cl.
*G02F 1/153* (2006.01)
(52) U.S. Cl. ............... 359/265; 359/267; 359/268; 359/272; 359/274; 355/406; 345/173
(58) Field of Classification Search ........ 359/265–275; 355/406; 345/173
See application file for complete search history.

(56) References Cited

U.S. PATENT DOCUMENTS 4,911,536 A * 3/1990 Ditzik ..................... 345/173
5,160,371 A * 11/1992 Ito ........................... 106/31.16
5,179,065 A * 1/1993 Ito ........................... 503/202
5,296,331 A * 3/1994 Taguchi ................... 430/253
6,473,058 B1 * 10/2002 Hotomi et al. ........... 345/173
6,473,072 B1 * 10/2002 Comiskey et al. ....... 345/173
7,002,555 B1 * 2/2006 Jacobsen et al. ......... 345/173

FOREIGN PATENT DOCUMENTS

JP          53147559 A  * 12/1978  ............. 359/265

* cited by examiner

*Primary Examiner*—Evelyn A. Lester
(74) *Attorney, Agent, or Firm*—Thomas, Kayden, Horstemeyer & Risley

(57) ABSTRACT

A pressure sensitive electrochromic device at least comprises a first substrate and a second substrate disposed opposite; a pressure sensitive layer disposed on the first substrate; an electrochromic layer disposed on the pressure sensitive layer; and a third conductive layer disposed between the electrochromic layer and the second substrate. The pressure sensitive layer includes a first conductive layer disposed on the first substrate; an insulative layer in which numerous conductive grains are distributed; and a second conductive layer disposed on the insulative layer. Also, at least one of the first and second substrates is made of the flexible material. An external circuit is applied for connecting the first and third conductive layers.

26 Claims, 2 Drawing Sheets

PRESSURE SENSITIVE ELECTROCHROMIC DEVICE AND METHOD OF FABRICATING THE SAME

This application claims the benefit of Taiwan application Serial No. 095110430, filed Mar. 24, 2006, the subject matter of which is incorporated herein by reference.

BACKGROUND OF THE INVENTION

1. Field of the Invention

The invention relates in general to an electrochromic device and method of fabricating the same, and more particularly to the pressure sensitive electrochromic device and method of fabricating the same.

2. Description of the Related Art

In the recent thirty years, Electro Optical technology has paid attention to the electrochromic device. Electrochromic devices are devices in which a physical/chemical change produced in response to the induced electric field results in a change in the reflective or transmissive properties of the device with respect to electromagnetic radiations, e.g., UV, visible and IR radiations. Also, the electrochromic image formed by the application of an appropriate voltage to an electrochromic cell persists for a useful period after the activating voltage is discontinued, generally until it is erased by application of an appropriate voltage of reversed polarity. Simply saying, electrochromism is related to color change by the reversible electrochemical process. Due to the reversible electrochemical process, the electrochromic layer changes between the bleached state and the colored state.

The electrochromic layer usually comprises an inorganic metal oxide, most commonly a transition metal oxide, in particular tungsten oxide (WO3). The reversible electrochemical reaction of tungsten oxide:

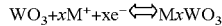

$$WO_3 + xM^+ + xe^- \Longleftrightarrow M_xWO_3$$

M is hydrogen anions ($H^+$), lithium anions ($Li^+$) or sodium anions ($Na^+$); x is typically up to about 0.5, determined by the electric current passing the electrochromic layer. Colorless or light yellow tungsten oxide will be reduced and becomes blue or deep blue tungsten bronze ($M_xWO_3$) due to the injection of $M^+$ and $e^-$.

As a electric current is applied, $M^+$ and $e^-$ are conducted into tungsten oxide so as to reduce colorless tungsten oxide to blue tungsten bronze ($M_xWO_3$); this is known as "coloration". If blue tungsten bronze loses $M^+$ and $e^-$, the colored electrochromic layer will be uncolored (by oxidizing blue tungsten bronze to colorless tungsten oxide); this is known as "bleaching reaction".

The electrochromic layer may be selected from any electrochromic material, including cathodic electrochromic materials, anodic electrochromic materials and cathodic/anodic electrochromic materials; many of which are well known to those skilled in the art and commercially available. Cathodic electrochromic materials (i.e. cathodic coloration materials) include non-stoichiometric (i.e., oxygen deficient) metal oxides wherein the metal has variable oxidation states. Exemplary of such cathodic electrochromic materials are tungsten oxide, molybdenum oxide, vanadium oxide, titanium oxide, lead oxide, and bismuth oxide and compatible mixtures of any of them. Anodic electrochromic materials include fully oxidized compounds comprising metal wherein the metal has variable oxidation states. Exemplary of such anodic electrochromic materials are Prussian blue, iridium oxide and nickel hydroxide and compatible mixtures of any of them. The most commonly used and studied electrochromic material is tungsten oxide (WO3), due to its highest coloration efficiency, excellent reversibility, low price and non-toxicity.

The electrochromic device is an electrochemical system and generally includes several thin films. The must-have electrochromic layer comprises one, two or more than two electrochromic materials. FIG. 1 (prior art) is a cross-sectional view of a conventional electrochromic device. The conventional electrochromic device 1 comprises a first substrate 11 and a second substrate 12 disposed opposite; a first transparent conducting film 13 and a second transparent conducting film 14 respectively formed on the first substrate 11 and the second substrate 12; a cathode 15 and an anode 16; an electrolyte (solid or liquid state) 17 between the cathode 15 and the anode 16; an external circuit provided to the first transparent conducting film 13 and the second transparent conducting film 14 being connected to a voltage providing source. The first substrate 11 and the second substrate 12 could be made of the transparent glass. The first transparent conducting film 13 and the second transparent conducting film 14 could be made of conductive indium tin oxide (ITO). At least one of the cathode 15 and the anode 16 comprises the electrochromic material which is responsible for the major color change of the electrochromic device; the one is knows as "electrochromic working electrode", and the other is knows as "counter electrode".

If the counter electrode is substituted by a layer containing the other electrochromic material, which means the device comprises both anodic and cathodic electrochromic materials (i.e. electrochromic materials darkened or bleached simutaneously), the device is known as a "complementary electrochromic device". The complementary electrochromic device has wider range of optical density, increased transmittance variation and more colors in change.

The electrochromic device has been widely applied to various applications. If the electrochromic device comprises every transparent layer, it can be used to construct the "smart windows" (a new generation of windows) for the building or the cars for the purpose of energy saving. Flip a switch and an electrochromic smart window can change from clear to fully darkened or any level of tint in-between. The changeable windows allow for privacy, to cut down glare, and to ward off increases in solar heat. The action of an electric field signals the change in the window's optical and thermal properties. Once the field is reversed, the process is also reversed. Many applications such as the sunglasses, the advertisement posters, the reflectance-adjustable automatic rearview mirrors (protecting the driver from glare effects), the current indicators and the light filter are also commercially available. Early research indicates that electrochromic technology can save substantial amounts of energy, and may eventually replace traditional solar control technology such as tints, reflective films and shading devices.

SUMMARY OF THE INVENTION

It is therefore an object of the present invention to provide a pressure sensitive electrochromic device and method of fabricating the same, for increasing the various possibilities of the electrochromic applications.

The present invention achieves the objects by providing a pressure sensitive electrochromic device, at least comprising: a first substrate and a second substrate disposed opposite; a pressure sensitive layer disposed on the first substrate; an electrochromic layer disposed on the pressure sensitive layer; and a third conductive layer disposed between the electrochromic layer and the second substrate. The pressure sensitive layer comprises a first conductive layer disposed on the first substrate, an insulative layer disposed on the first conductive layer, and a second conductive layer disposed on the insulative layer. Several conductive grains are distributed in the insulative layer. Also, an external circuit is applied across the first conductive layer and the third conductive layer.

The present invention achieves the objects by providing a method of fabricating pressure sensitive electrochromic device, comprising steps of:

providing a first substrate and a second substrate, at least one of which being made of a flexible material;

forming a pressure sensitive layer on the first substrate, comprising:

forming a first conductive layer on the first substrate;

forming an insulative layer on the first conductive layer, and a plurality of conductive grains distributed in the insulative layer; and forming a second conductive layer on the insulative layer;

forming a third conductive layer on the second substrate;

depositing an electrochromic layer on the third conductive layer;

assembling the first substrate and the second substrate so that the electrochromic layer is disposed between the third conductive layer and the pressure sensitive layer; and providing an external circuit across the first conductive layer and the third conductive layer.

Other objects, features, and advantages of the present invention will become apparent from the following detailed description of the preferred but non-limiting embodiment. The following description is made with reference to the accompanying drawings.

DETAILED DESCRIPTION OF THE INVENTION

In the present embodiment of the invention, a pressure sensitive electrochromic device is provided for developing the applications of electrochromic technology. It is noted that the embodiment disclosed herein is used for illustrating the present invention, but not for limiting the scope of the present invention. Additionally, the drawings used for illustrating the embodiment and applications of the present invention only show the major characteristic parts in order to avoid obscuring the present invention. Accordingly, the specification and the drawings are to be regard as an illustrative sense rather than a restrictive sense.

Figure 1:
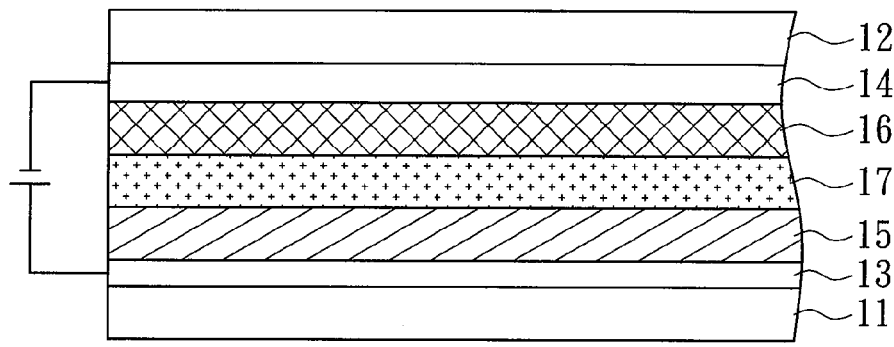
FIG. 1 (prior art) is a cross-sectional view of a conventional electrochromic device.
Figure 2:
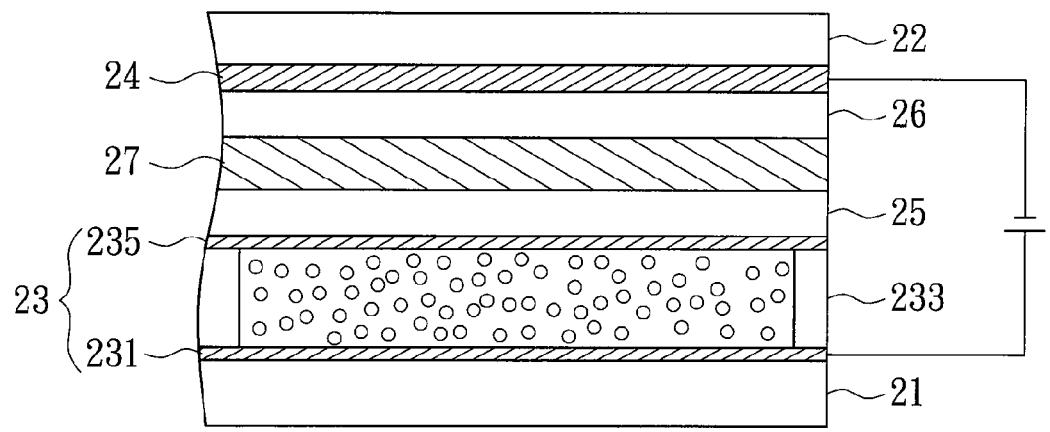
FIG. 2 is a cross-sectional view of a pressure sensitive electrochromic device according to the preferred embodiment of the present invention.

FIG. 2 is a cross-sectional view of a pressure sensitive electrochromic device according to the preferred embodiment of the present invention. The pressure sensitive electrochromic device 2 at least comprises a first substrate 21 and a second substrate 22 disposed opposite; a pressure sensitive layer 23 disposed on the first substrate 21; an electrochromic layer 26 disposed on the pressure sensitive layer 23; a third conductive layer 24 disposed on the electrochromic layer 26; and an external circuit connected to a voltage providing source.

The pressure sensitive layer 23 comprise a first conductive layer 231 disposed on the first substrate 21; an insulative layer 233 disposed on the first conductive layer 231, and a plurality of conductive grains 234 distributed in the insulative layer 233; and a second conductive layer 235 disposed on the insulative layer 233. The external circuit connects the first conductive layer 231 and the third conductive layer 24. Materials of the first conductive layer 231, the second conductive layer 235 and the third conductive layer 24 could be indium tin oxide (ITO), a transparent conductive glue, a conductive plastic or the like.

Materials of the conductive grains 234 distributed in the insulative layer 233 could be transparent (such as ITO grains) or opaque (such as carbonic grains). The conductivity of the conductive grains 234 is preferably between that of the conductor and semiconductor. Selection of the conductive grains material depends on the requirement of the practical application, and is not limited herein.

Materials of the first substrate 21 and the second substrate 22 could independently be glass, metal or plastic. It is noted that at least one of the first substrate 21 and the second substrate 22 is made of a flexible material, such as flexible plastic. For example, the plastic material could be polymethyl methacrylate (PMMA), polyethylene terephthalate (PET), or polycarbonate (PC).

When no external pressure is applied to the pressure sensitive electrochromic device 2, the device 2 remains the original shape, as shown in FIG. 2. Also, the first conductive layer and the third conductive layer are electrically disconnected due to the existence of the insulative layer 233, and the color of the electrochromic layer is unchanged.

Figure 3A:
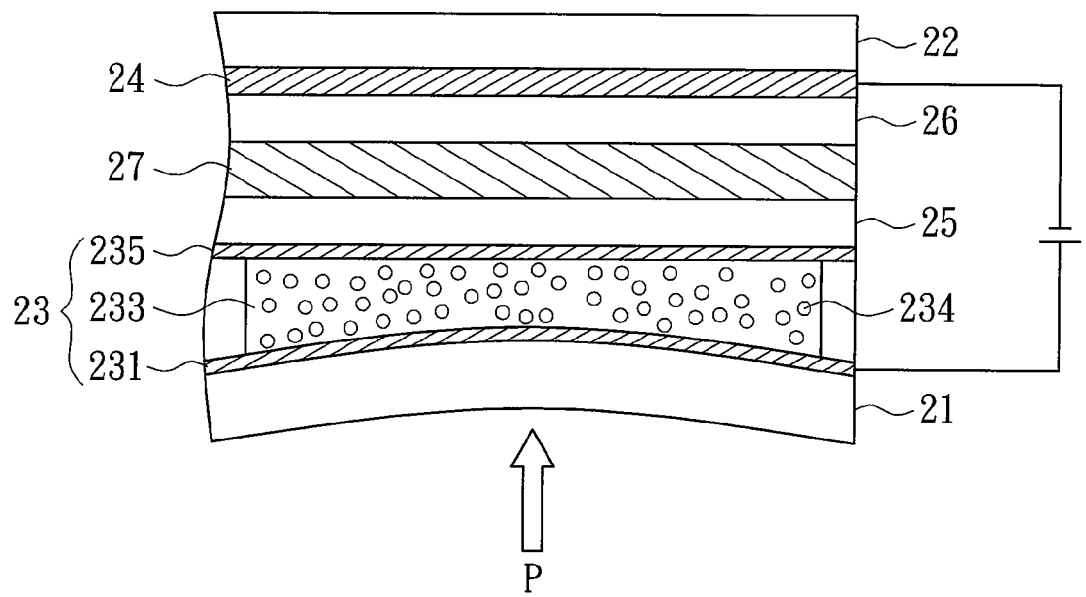
FIG. 3A and FIG. 3B are cross-sectional views respectively showing the first and the second substrates of the pressure sensitive electrochromic device of FIG. 2 deformed by the external pressure P.
Figure 3B:
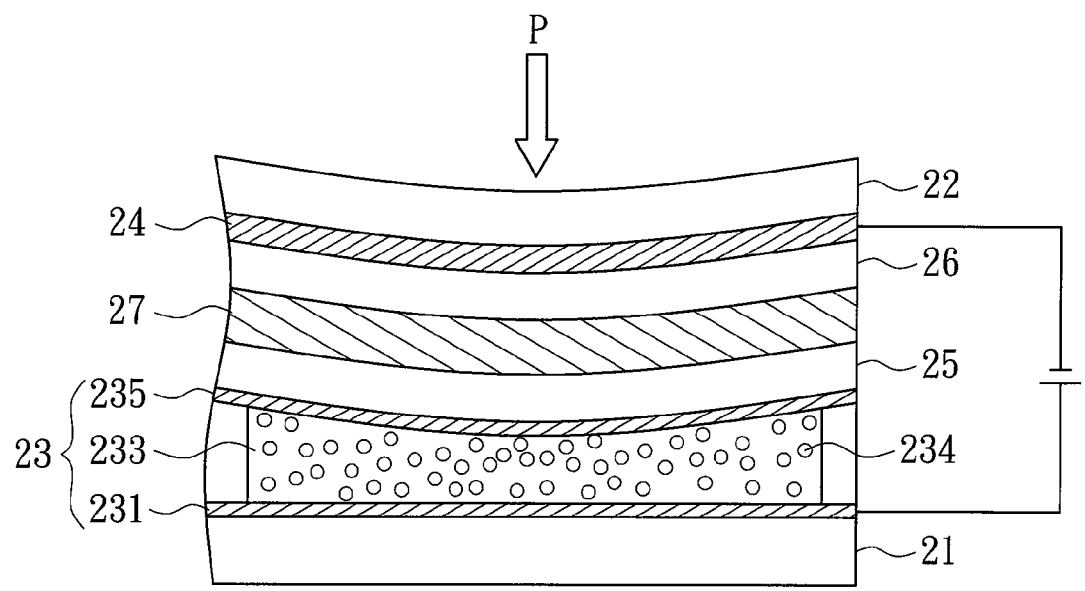

When an external pressure is applied to the pressure sensitive electrochromic device 2, the conductive grains 234 distributed in the insulative layer 233 are going to approach to each other and create one or several conductive paths in the insulative layer 233; therefore, the first conductive layer and the third conductive layer can be electrically connected, and cause the coloration of the electrochromic layer 26. FIG. 3A and FIG. 3B are cross-sectional views respectively showing the first and the second substrates of the pressure sensitive electrochromic device of FIG. 2 deformed by the external pressure P. In FIG. 3A, at least the first substrate 21 is made of the flexible material; in FIG. 3B, at least the second substrate 22 is made of the flexible material. When the first substrate 21 or the second substrate 22 is subjected to an external pressure P, the conductive grains 234 approach and some even contact each other by the deformed insulative layer 233. The coloration of the electrochromic layer 26 (colored by oxidation or reduction) is consequently observed.

It is noted that the electrochromic layer 26 may comprise one, two or more than two electrochromic materials, including organic or inorganic materials (such as tungsten oxide), and this is not limited in the invention. When the pressure sensitive electrochromic device 2 is subjected to different pressure, different electric currents will pass through the electrochromic layer 26 and cause different electrochromic colorations. Take the electrochromic layer 26 comprising two different electrochromic materials A and B for example. If color change potential of the electrochromic materials A and B are respectively 3 volts and 5 volts, color of the electrochromic material A is changed and the electrochromic layer 26 exhibits a first colored state when 3 volts is applied across the first conductive layer 231 and the third conductive layer 24 by an external pressure. If the external pressure continuously increases until 5 volts applied across the first conductive layer 231 and the third conductive layer 24, the color of the electrochromic material B is going to changed, and the electrochromic layer 26 exhibits a second colored state.

Moreover, an ion conducting layer 25 can be optionally disposed between the pressure sensitive layer 23 and the electrochromic layer 26; an electrolytic layer 27 disposed between the ion conducting layer 25 and the electrochromic layer 26, determined by the selection of the electrochromic material(s). It is well known to one skilled in the art that the ion conducting layer 25 may include hydrogen anions (H+) or lithium anions (Li+), and the electrolytic layer 27 could be solid state, liquid state (ex. the edges of the device be sealed to retain the liquid electrolyte), or gel-type electrolytic.

The pressure sensitive electrochromic device according to the preferred embodiment of the present invention could be prepared according to the description below. Please also refer to FIG. 2. First, a first substrate 21 and a second substrate 22 are provided, and at least one of which is made of a flexible material. Then, a pressure sensitive layer 23 is formed on the first substrate 21. Formation of the pressure sensitive layer 23 further comprises a first conductive layer 231 formed on the first substrate 21, an insulative layer 233 formed on the first conductive layer 231, and a second conductive layer 235 formed on the insulative layer 233. Also, the conductive grains (such as ITO grains or carbonic grains) 234 are distributed in the insulative layer 233.

In addition, a third conductive layer 24 is formed on the second substrate 22; then, an electrochromic layer 26 is deposited over the third conductive layer 24, preferably by evaporation or sputtering to a predetermined thickness. The electrochromic layer 26 may comprise one, two or more than two electrochromic materials. Optionally, an ion conducting layer 25 is disposed on the second substrate 22, and an electrolytic layer 27 is disposed on the ion conducting layer 25, depending on the electrochromic material(s) of the electrochromic layer 26. Afterward, the first substrate 21 and the second substrate 22 are assembled so that the electrochromic layer 26 is disposed between the third conductive layer 24 and the pressure sensitive layer 27. Also, an external circuit is formed to connect the first conductive layer 231 and the third conductive layer 24, to complete the fabrication of the pressure sensitive electrochromic device 2 of FIG. 2. Practically, the first conductive layer 231 and the third conductive layer 24 can be provided with external electrical leads (not shown in FIG. 2) connected to a voltage providing source (not shown in FIG. 2) to create the external circuit.

Moreover, material of each layer of FIG. 2 is selected according to requirement of the practical application. For example, if a completely transparent device is needed for an application product, the transparent material of each layer, including the first substrate 21, the second substrate 22, the insulative layer 233 and the conductive grains 234, should be chosen. If one side of the device is required to be transparent in another application product (ex. the human eyes seeing the device from the first substrate 21 to the second substrate 22), at least the first substrate 21 is made of the transparent material, and the other layers could be transparent or opaque, depending the detail requirements of the application product.

The pressure sensitive electrochromic device according to the embodiment of the invention can be applied to several different products, such as being the robot skin which imitates the response of human skin under pressure, being the touch surface of a pressure sensitive board (i.e. the handwriting on the board formed by the external pressure would persist for a useful period after the external pressure is discontinued, until the board is erased by application of reversed reaction), and so on. Thus, the embodiment of the invention can be applied to any product required to exhibit the color change (such as coloration to bleaching) by applying the external pressure. Accordingly, the pressure sensitive electrochromic device of the invention develops the applications of electrochromic technology. Additionally, compared to the conventional touch-panel technique (ex. liquid crystal touch panel, and electroluminescent device with touch screen), the pressure sensitive electrochromic device of the invention possesses the advantages of high contrast, low operating voltage, wide operating temperature adequate coloration-bleaching efficiency, UV-stability, low energy consumption, privacy protection and having "memory" (i.e. the length of time a material is persistent) function.

While the invention has been described by way of example and in terms of the preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pressure sensitive electrochromic device, at least comprising:
    a first substrate and a second substrate disposed opposite;
    a pressure sensitive layer, comprising:
        a first conductive layer disposed on the first substrate;
        an insulative layer disposed on the first conductive layer, and a plurality of conductive grains distributed in the insulative layer; and
        a second conductive layer disposed on the insulative layer;
    an electrochromic layer disposed on the pressure sensitive layer;
    a third conductive layer disposed between the electrochromic layer and the second substrate; and
    an external circuit applied across the first conductive layer and the third conductive layer.

2. The pressure sensitive electrochromic device according to claim 1, wherein the first conductive layer and the third conductive layer are electrically disconnected, and color of the electrochromic layer is unchanged if no external pressure is applied to the device.

3. The pressure sensitive electrochromic device according to claim 1, wherein the first conductive layer and the third conductive layer are electrically connected, and the electrochromic layer is colored if an external pressure is applied to the device.

4. The pressure sensitive electrochromic device according to claim 1, wherein when a first pressure is applied to one of the first substrate and the second substrate, a first electric current passes through the electrochromic layer and the electrochromic layer exhibits a first colored state.

5. The pressure sensitive electrochromic device according to claim 4, wherein when a second pressure is applied to one of the first substrate and the second substrate, a second electric current passes through the electrochromic layer and the electrochromic layer exhibits a second colored state different from the first colored state.

6. The pressure sensitive electrochromic device according to claim 1, wherein the electrochromic layer comprises at least two electrochromic materials having different color changing potentials.

7. The pressure sensitive electrochromic device according to claim 1, wherein the conductive grains distributed in the insulative layer are a plurality of opaque grains.

8. The pressure sensitive electrochromic device according to claim 7, wherein the opaque grains are carbonic grains.

9. The pressure sensitive electrochromic device according to claim 1, wherein the conductive grains distributed in the insulative layer are a plurality of transparent indium tin oxide (ITO) grains.

10. The pressure sensitive electrochromic device according to claim 1, wherein the first substrate and the second substrate are independently made of a glass, a metal or a plastic material.

11. The pressure sensitive electrochromic device according to claim 10, wherein the plastic material comprises polymethyl methacrylate (PMMA), polyethylene terephthalate (PET), or polycarbonate (PC).

12. The pressure sensitive electrochromic device according to claim 1, wherein the first conductive layer, the second conductive layer and the third conductive layer are independently made of an indium tin oxide (ITO) material, a transparent conductive glue, or a conductive plastic.

13. The pressure sensitive electrochromic device according to claim 1, further comprising:
    an ion conducting layer, disposed between the pressure sensitive layer and the electrochromic layer.

14. The pressure sensitive electrochromic device according to claim 13, further comprising:
    an electrolytic layer, disposed between the ion conducting layer and the electrochromic layer.

15. A method of fabricating pressure sensitive electrochromic device, comprising steps of:
    providing a first substrate and a second substrate, at least one of which being made of a flexible material;
    forming a pressure sensitive layer on the first substrate, comprising:
       forming a first conductive layer on the first substrate;
       forming an insulative layer on the first conductive layer, and a plurality of conductive grains distributed in the insulative layer; and
       forming a second conductive layer on the insulative layer;
    forming a third conductive layer on the second substrate;
    depositing an electrochromic layer on the third conductive layer;
    assembling the first substrate and the second substrate so that the electrochromic layer is disposed between the third conductive layer and the pressure sensitive layer; and
    providing an external circuit across the first conductive layer and the third conductive layer.

16. The method according to claim 15, wherein when a first pressure is applied to one of the first substrate and the second substrate, a first electric current passes through the electrochromic layer and the electrochromic layer exhibits a first colored state.

17. The method according to claim 16, wherein when a second pressure is applied to one of the first substrate and the second substrate, a second electric current passes through the electrochromic layer and the electrochromic layer exhibits a second colored state different from the first colored state.

18. The method according to claim 15, wherein the electrochromic layer comprises at least two electrochromic materials having different color changing potentials.

19. The method according to claim 15, wherein the conductive grains distributed in the insulative layer are a plurality of opaque grains.

20. The method according to claim 19, wherein the opaque grains are carbonic grains.

21. The method according to claim 15, wherein the conductive grains distributed in the insulative layer are a plurality of transparent indium tin oxide (ITO) grains.

22. The method according to claim 15, wherein the first substrate and the second substrate are independently made of a glass, a metal or a plastic material.

23. The method according to claim 22, wherein the plastic material comprises polymethyl methacrylate (PMMA), polyethylene terephthalate (PET), or polycarbonate (PC).

24. The method according to claim 15, wherein the first conductive layer, the second conductive layer and the third conductive layer are independently made of an indium tin oxide (ITO) material, a transparent conductive glue, or a conductive plastic.

25. The method according to claim 15, further comprising:
    forming an ion conducting layer on the second conductive layer, and the ion conducting layer being disposed between the pressure sensitive layer and the electrochromic layer after assembling the first substrate and the second substrate.

26. The method according to claim 25, further comprising:
    forming an electrolytic layer on the ion conducting layer, and the electrolytic layer being disposed between the ion conducting layer and the electrochromic layer after assembling the first substrate and the second substrate.

* * * * *